US011027507B2

(12) United States Patent
De Graaf et al.

(10) Patent No.: US 11,027,507 B2
(45) Date of Patent: Jun. 8, 2021

(54) TIRE BUILDING DRUM AND METHOD FOR OPERATING SAID TIRE BUILDING DRUM

(71) Applicant: VMI HOLLAND B.V., Epe (NL)

(72) Inventors: Martin De Graaf, Epe (NL); Dave Papot, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 16/492,048

(22) PCT Filed: Mar. 16, 2018

(86) PCT No.: PCT/NL2018/050167
§ 371 (c)(1),
(2) Date: Sep. 6, 2019

(87) PCT Pub. No.: WO2018/174708
PCT Pub. Date: Sep. 27, 2018

(65) Prior Publication Data
US 2020/0282680 A1    Sep. 10, 2020

(30) Foreign Application Priority Data

Mar. 23, 2017   (NL) .................................... 2018566

(51) Int. Cl.
*B29D 30/24*       (2006.01)
*B29D 30/26*       (2006.01)

(52) U.S. Cl.
CPC ...... *B29D 30/24* (2013.01); *B29D 2030/2642* (2013.01); *B29D 2030/2657* (2013.01)

(58) Field of Classification Search
CPC .... B29D 2030/2657; B29D 2030/2642; B29D 30/24; B29D 30/242; B29D 2030/3264;
(Continued)

(56) References Cited

U.S. PATENT DOCUMENTS 3,547,733 A   12/1970   Leblond ..................... 156/415
3,867,231 A   2/1975    Casey ......................... 156/415
(Continued)

FOREIGN PATENT DOCUMENTS

CN    1982041      6/2007    ........... B29D 30/247
CN    101920568    12/2010   ............ B29D 30/24
(Continued)

OTHER PUBLICATIONS

Chinese Official Action issued in corresponding Chinese Patent Application Serial No. 201880019284.5 (with English translation), dated Jun. 9, 2020 (13 pages).
(Continued)

*Primary Examiner* — Robert C Dye
*Assistant Examiner* — Alexander D Booth
(74) *Attorney, Agent, or Firm* — Hayes Soloway P.C.

(57) ABSTRACT

Disclosed is a tire building drum and method for operating the tire building drum, which tire building drum include a left section, a right section, a center section, and a support member for supporting the center section in the radially outward direction. The support member is movable together with the center section in the radially outward direction. The tire building drum further includes a blocking device for blocking the support member against movement in a radially inward direction when the center section is in the expanded position.

25 Claims, 10 Drawing Sheets

(58) Field of Classification Search
CPC .......... B29D 2030/3214; B29D 30/247; B29D 30/246; B29D 30/26
USPC ................. 156/417, 418, 419, 420
See application file for complete search history.

(56) References Cited

U.S. PATENT DOCUMENTS

| | | | | |
|---|---|---|---|---|
| 4,436,574 | A * | 3/1984 | Long .................... | B29C 53/824 |
| | | | | 156/415 |
| 5,268,057 | A | 12/1993 | Nojiri et al. .................. | 156/415 |
| 5,490,897 | A | 2/1996 | Miyanaga et al. ............ | 156/415 |
| 7,740,040 | B2 | 6/2010 | Ravat ........................... | 156/401 |
| 9,789,658 | B2 | 10/2017 | Marchini et al. ...... | B29D 30/26 |
| 9,849,643 | B2 | 12/2017 | Kawauchi et al. ..... | B29D 30/26 |
| 2007/0095481 | A1* | 5/2007 | Graaf .................... | B29D 30/242 |
| | | | | 156/414 |
| 2012/0073728 | A1 | 3/2012 | Takasuga .................. | 156/110.1 |
| 2014/0161584 | A1 | 6/2014 | Kohnen et al. ........ | B29D 30/48 |
| 2015/0239190 | A1* | 8/2015 | Currie ................ | B29D 30/2607 |
| | | | | 156/417 |
| 2017/0080657 | A1 | 3/2017 | Bor ..................... | B29D 30/247 |

FOREIGN PATENT DOCUMENTS

| | | | |
|---|---|---|---|
| CN | 102232021 | 11/2011 | ............. B29D 30/24 |
| CN | 104395061 | 3/2015 | ............. B29D 30/24 |
| JP | S40-1644 | 1/1940 | |
| JP | S46-29376 | 8/1971 | |
| JP | H3-184834 | 8/1991 | ............. B29D 30/24 |
| JP | H7-24929 | 1/1995 | ............. B29D 30/24 |
| JP | H07-24931 | 1/1995 | ............. B29D 30/24 |
| JP | H11-151763 | 6/1999 | ............. B29D 30/24 |
| JP | 2009-160845 | 7/2009 | ............. B29D 30/24 |
| JP | WO2010140485 | 12/2010 | ............. B29D 30/24 |
| JP | 2016-203496 | 12/2016 | ............. B29D 30/24 |
| WO | WO2015132351 | 9/2015 | ............. B29D 30/24 |

OTHER PUBLICATIONS

Decision to Grant issued in related Japanese Patent Application Serial No. 2018-564800, dated Nov. 18, 2019 with translation (5 pages).
International Search Report and Written Opinion issued in application No. PCT/NL2018/050167, dated Jun. 1, 2018 (9 pgs).

* cited by examiner

TIRE BUILDING DRUM AND METHOD FOR OPERATING SAID TIRE BUILDING DRUM

BACKGROUND

The invention relates to a tire building drum and a method for operating said tire building drum.

WO 2015/132351 A1 discloses a tire building drum comprising a support, a central shaft and a number of segments together defining the cylindrical main surface. Each segment is made in three parts: two end parts and a central portion. The end parts of segments are connected by means of the angle levers to the support and the central portions of the segments are connected by radial arms to a central ring fixed to the shaft. The radial arms guide the central portions during the movement between the two extreme positions of the drum.

When the known tire building drum is expanded radially, the segments may be subjected to contracting forces as a result of the limited elasticity of the tire components. Moreover, several tire building operations, such as stitching, may be performed on the cylindrical main surface which exert radially inward forces onto said cylindrical main surface. The segments, and in particular the center portions thereof may bend inwards slightly as a result of these forces. However, even the slightest bending may cause irregularities in the tire components supported on the cylindrical main surface.

It is an object of the present invention to provide a tire building drum and a method for operating said tire building drum, wherein rigidity of the center section can be improved.

SUMMARY OF THE INVENTION

According to a first aspect, the invention provides a tire building drum comprising a left section, a right section and a center section which are rotatable about a central drum axis, wherein the center section forms a circumferential support surface of the tire building drum for supporting one or more tire components, wherein the left section and the right section are expandable in a radially outward direction with respect to the central drum axis, wherein the center section is supported on the left section and the right section and expandable in the radially outward direction with respect to the central drum axis together with the left section and the right section from a contracted position to an expanded position, wherein the tire building drum comprises a support member between the left section and the right section for supporting the center section in the radially outward direction, wherein the support member is movable together with the center section in the radially outward direction, wherein the tire building drum further comprises a blocking device for blocking the support member against movement in a radially inward direction with respect to the central drum axis when the center section is in the expanded position.

Hence, the rigidity of the center section can be improved significantly when the center section is in the expanded position. The center section can thus provide a reliable circumferential support surface for supporting one or more tire components during tire building operations, such as stitching.

In a preferred embodiment the blocking device comprises a blocking surface that is radially fixed with respect to the central drum axis, wherein the support member is arranged to be moved in the radially outward direction away from said blocking surface when the center section is moved towards the expanded position, wherein the blocking device further comprises a first blocking body that is insertable in a first insertion direction into a blocking position in which the first blocking body is located in the radially inward direction between the support member and the blocking surface.

The blocking surface can provide a reliable and/or stable base for the first blocking body which in turn can reliably block the support member against movement in the radially inward direction with respect to said blocking surface. Hence, through the combination of the blocking surface, the first blocking body and the support member, the center section can be rigidly supported with respect to the central drum axis.

In an embodiment thereof the blocking device comprises a second blocking body that is insertable in a second insertion direction opposite to the first insertion direction into a blocking position in which the second blocking body is located in the radially inward direction between the support member and the blocking surface. By inserting a second blocking body, the reliability and/or stability of the blockage of the support member with respect to the blocking surface can be increased.

In a further embodiment thereof the first insertion direction is an axial direction parallel to the central drum axis. Hence, the first blocking body can be inserted in said axial direction.

In a preferred embodiment the blocking device comprises an insertion biasing element for biasing the first blocking body to move in the first insertion direction into the blocking position. The insertion can thus occur automatically as soon as the support member has been moved sufficiently in the radially outward direction together with the center section.

In an alternative preferred embodiment the blocking device comprises an insertion biasing element that is located between the first blocking body and the second blocking body for biasing the first blocking body and the second blocking body to move in the first insertion direction and the second insertion direction, respectively, into the blocking position. Hence, the insertion of both the first blocking body and the second blocking body can occur automatically with the use of the same insertion biasing element.

In a further embodiment based on any one of the previous two embodiments the left section and the right section are movable in an axial direction parallel to the central drum axis, wherein the left section is arranged for displacing the first blocking body in a first release direction opposite to the first insertion direction from the blocking position into a release position for releasing the blockage of the support member in the radially inward direction. The left section and the right section are typically moved in the axial direction during various stages of the tire building. In this embodiment, said movements in the axial direction can be used to release the blockage. Hence, the release does not require actuation of a dedicated release mechanism.

In an embodiment thereof the left section comprises a base and wherein the tire building drum (1, 101, 201, 301) comprises a first displacement member that is movable with respect to the base in a direction parallel to the first insertion direction for displacing the first blocking body in the first release direction, wherein the left section further comprises a displacement biasing element for biasing the first displacement member in the first release direction. By allowing the first displacement member to move in the insertion direction, the first displacement member can be moved away from the support member, thereby allowing the left section to approach the support member more closely. Hence, the range of movement of the left section in the axial direction can be increased.

In a further embodiment thereof the displacement biasing element is stronger than the insertion biasing element. This can ensure that when the first displacement member contacts the first blocking body, the first displacement member causes first blocking body to move in the first release direction, thereby effectively terminating the blockage of the support member.

In a further embodiment the left section and the right section are movable in an axial direction parallel to the central drum axis, wherein the left section and the right section are arranged for displacing the first blocking body and the second blocking body in a first release direction and a second release direction, respectively, opposite to the first insertion direction and the second insertion direction, respectively, from the blocking position into a release position for releasing the blockage of the support member in the radially inward direction. Again, the movements of the left section and the right section in the axial direction can be used to effectively terminate the blockage of the support member. A separate dedicated release mechanism is not required.

In a further embodiment the tire building drum further comprises a return member for returning the support member in the radially inward direction when the blockage of the support member is released. Hence, the return of the support member can occur automatically as soon as the blockage of the support member is released and/or terminated.

In a preferred embodiment the support member is arranged for abutting the blocking surface when the center section is in the contracted position. The support member can thus also reliably and/or rigidly support the center section with respect to the blocking surface in the contracted position of said center section.

In another embodiment the support member is arranged for supporting the center section in a center area where the center section is unsupported by the left section and the right section. Preferably, the support member is arranged for supporting the center section at a center of said center section between the left section and the right section. In said center area or at said center, the support member can most effectively prevent bending of the center section, in particular when the gap between the first section and the second section in the axial direction is relatively large.

In another embodiment the support member is connected to the center section. Preferably, the support member is directly connected to the center section. The connection or the direct connection can improve the rigidity and/or the reliability of the support.

In another embodiment the center section comprises a plurality of deck segments that together form a center deck that defines the circumferential support surface of the tire building drum, wherein the tire building drum comprises one support member for each deck segment. Hence, each deck segment can individually be supported and blocked against movement in the radially inward direction of the respective deck segment.

In an embodiment thereof each support member is formed as a single piece with its respective deck segment. The integral connection can improve the rigidity and/or the reliability of the support.

In another embodiment the tire building drum further comprises a guide for guiding the movement of the support member in the radially outward direction and the radially inward direction. Said guide can ensure that the support member moves with respect to the blocking surface in the radially outward direction and the radially inward direction only.

In an embodiment thereof the guide comprises a first stopping member for restricting the movement of the support member in the radially outward direction. This can prevent that the support member is expanded to far, thereby defining the expanded position of the center section.

In a further embodiment thereof the guide comprises a second stopping member for restricting the movement of the support member in the radially inward direction. This can limit the support member to an inner position, thereby defining the contracted position of the center section.

In an embodiment thereof the deck segments are arranged for overlapping each other in a circumferential direction of the tire building drum when the center section is in the contracted position and/or the expanded position. In an alternative embodiment thereof the deck segments are arranged for meshing with each other in a circumferential direction of the tire building drum when the center section is in the contracted position and/or the expanded position. Hence, the deck segments can form a substantially closed circumferential support surface for the tire components in both the contracted position as well as the expanded position of the center section.

According to a second aspect, the invention provides a method for operating the tire building drum according to any one of the previously discussed embodiments, wherein the method comprises the steps of:

expanding the left section and the right section in the radially outward direction; expanding the center section in the radially outward direction into the expanded position together with the left section and the right section;

moving the support member together with the center section in the radially outward direction;

using the blocking device to block the support member against movement in a radially inward direction with respect to the central drum axis when the center section is in the expanded position.

The method relates to the practical implementation of the tire building drum according to the previously discussed embodiments and thus provides the same technical advantages as the previously discussed embodiments. These advantages will not be repeated hereafter.

In a preferred embodiment the method further comprises the step of moving the left section and the right section in an axial direction parallel to the central drum axis, wherein the movement of the left section in the axial direction releases the blockage of the support member in the radially inward direction.

In an embodiment thereof the movement of the right section in the axial direction releases the blockage of the support member in the radially inward direction.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1A-1D and FIG. 2 show a tire building drum 1 according to an exemplary first embodiment of the invention. The tire building drum 1 is provided with or is supported on a drum shaft 10 that defines a central drum axis S for the tire building drum 1. The tire building drum 1 further comprises a radially expandable circumferential support surface 11 for supporting one or more tire components (not shown), e.g. one or more body plies.

The tire building drum 1 comprises a left section 2 in the form a first drum half and a right section 3 in the form of a second drum half. The left section 2 and the right section 3 are supported on the drum shaft 10. The left section 2 and the right section 3 are rotatable about the central drum axis S and movable in an axial direction A towards and away from each other parallel to said central drum axis S. When the left section 2 and the right section 3 are moved apart, they leave a gap in the axial direction A.

The left section 2 and the right section 3 are furthermore expandable and contractible with respect to the central drum axis S in a radially outward direction R1 and a radially inward direction R2, respectively. In particular, the both the left section 2 and the right section 3 comprises a plurality of crown segments 21, 31 distributed circumferentially about the central drum axis S. In this exemplary embodiment, the crown segments 21, 31 are wedge-shaped. The left section 2 and the right section 3 are further provided with a plurality of crown supports 22, 32 and a plurality of crown drives 23, 33, known per se, each with oppositely inclined drive surfaces 24, 25, 34, 35 which are arranged for slidably receiving a respective one of the crown segments 21, 31. When the crown drive 23, 33 is moved in the axial direction A towards the respective crown support 22, 32, as in FIG. 1B, the respective crown segment 21, 31 is driven in the radially outward direction R1 to expand the diameter of the tire building drum 1 at said crown segment 21, 31. Similarly, when the crown drive 23, 33 is moved in the axial direction A away from the respective crown support 22, 32, as in FIGS. 1C and 1D, the respective crown segment 21, 31 is lowered in the radially inward direction R2 to contract the diameter of the tire building drum 1.

The shaft 10 comprises a plurality of drive members, e.g. push-pull shafts or spindles (not shown and known per se), for driving the movements of the left section 2 and the right section 3 in the axial direction A and both radial directions R1, R2.

Figure 1A:
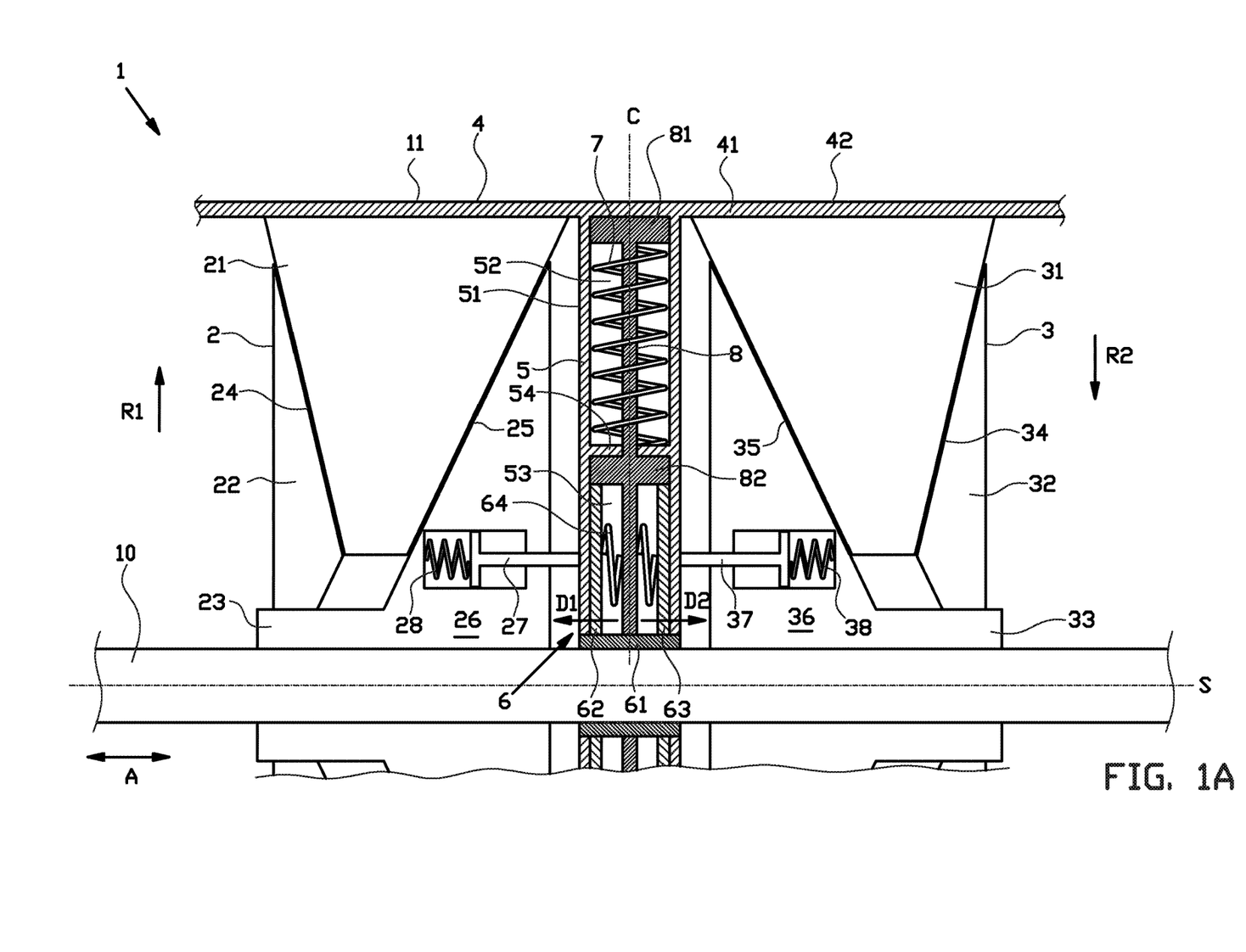
FIGS. 1A, 1B, 1C and 1D show cross sections of a tire building drum according to a first embodiment of the invention in a contracted position, an expanded position, a release position and a return position, respectively.
Figure 1B:
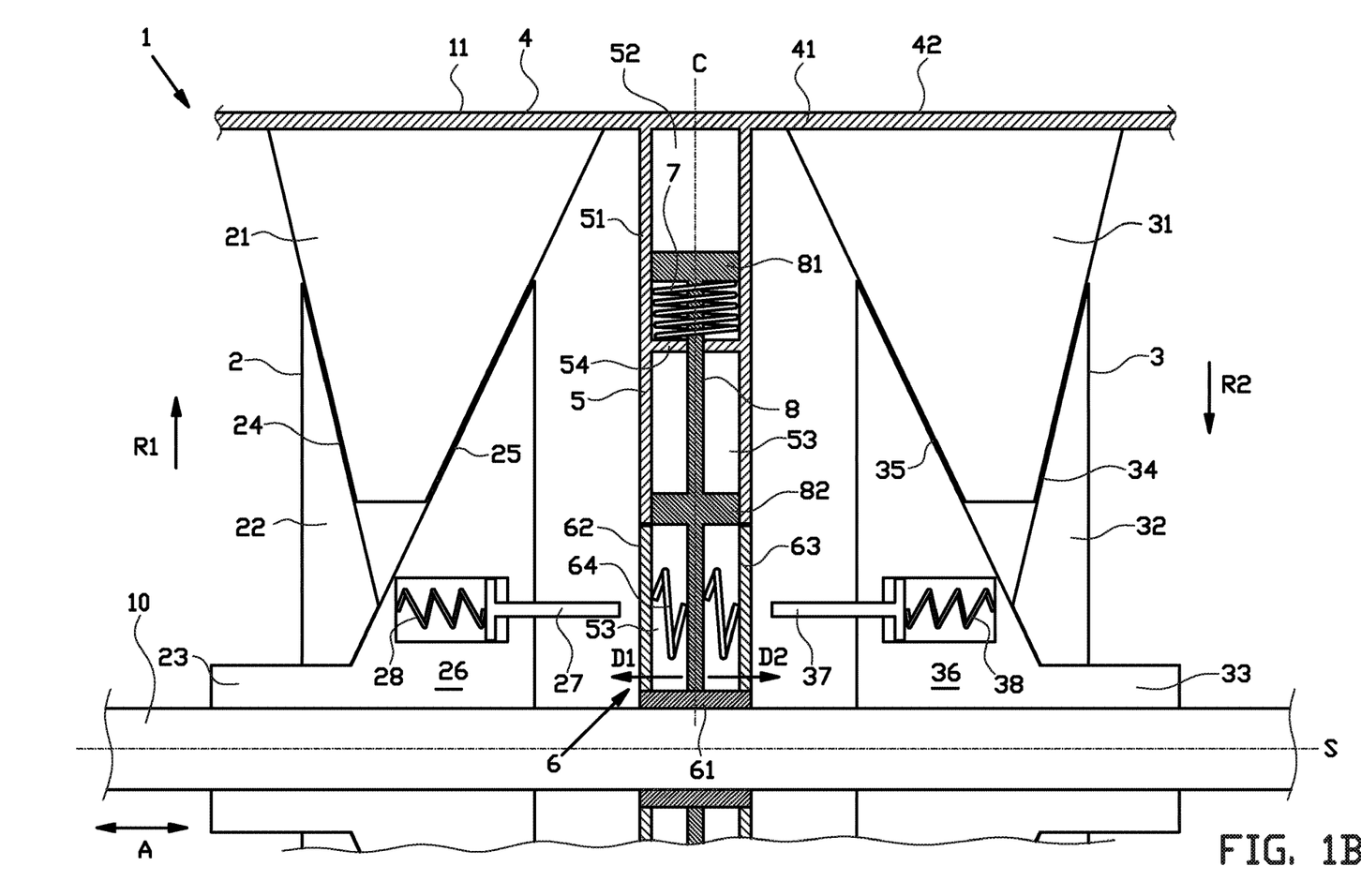

The tire building drum 1 further comprises a center section 4 that defines the circumferential support surface 11 of the tire building drum 1. Said support surface 11 is arranged for supporting tire components between the left section 2 and the right section 3, in particular in the gap in the axial direction A between the left section 2 and the right section 3. The center section 4 is supported on the left section 2 and the right section 3. In this particular example, the center section 4 is supported on the crown segments 21, 31 of the left section 2 and the right section 3. By supporting the center section 4 on the left section 2 and the right section 3, the center section 4 is expandable with respect to the central drum axis S in the radially outward direction R1 together with said left section 2 and said right section 3. The center section 4 is expandable from a contracted position, as shown in FIG. 1A, to an expanded position, as shown in FIG. 1B.

Figure 2:
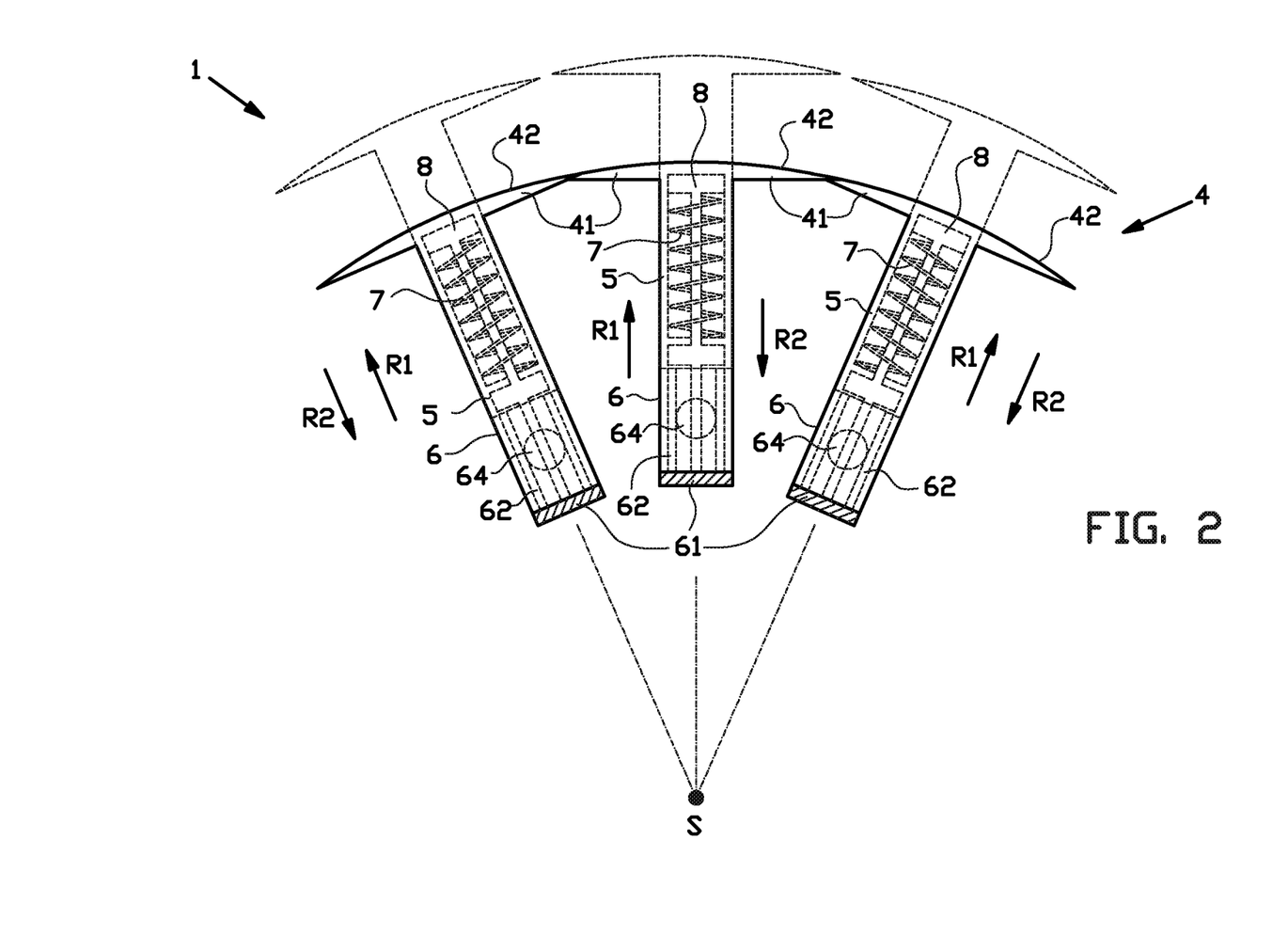
FIG. 2 show a side view of the tire building drum according to FIG. 1A.
Figure 3:
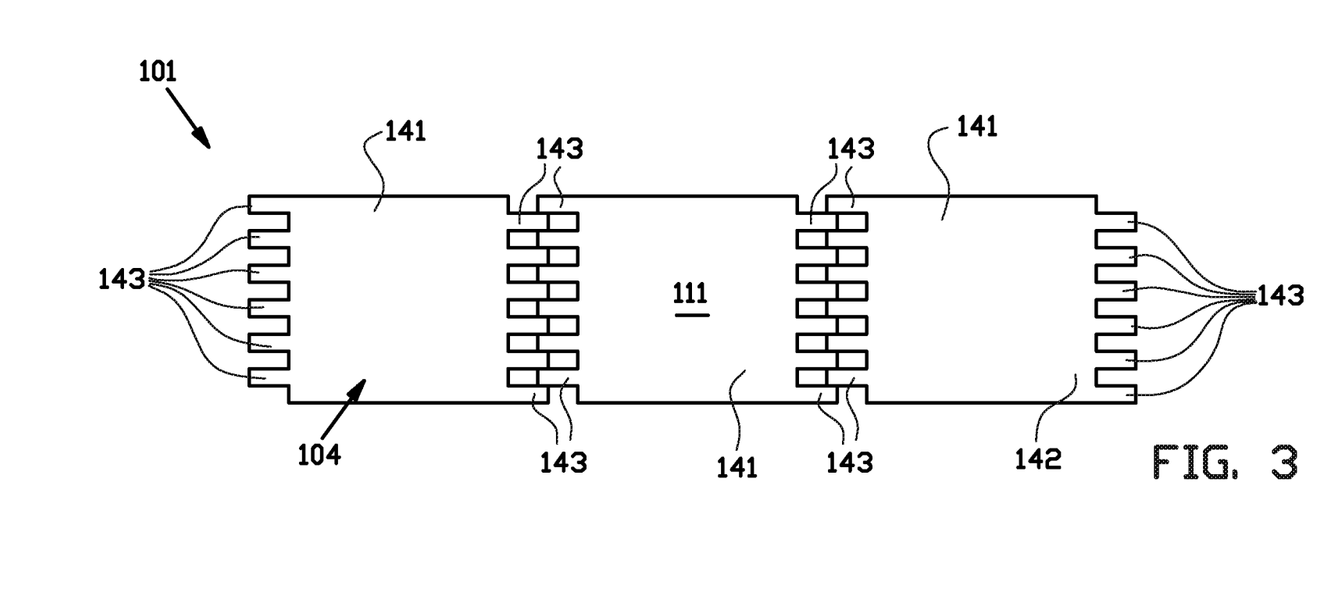
FIG. 3 shows a top view of an alternative tire building drum according to a second embodiment of the invention.

In this exemplary first embodiment, as shown in FIG. 2, the center section 4 comprises a plurality of deck segments 41 which are distributed in the circumferential direction about the central drum axis S to form a circumferentially extending and expandable center deck 42. Preferably, the deck segments 41 are arranged to overlap each other in the contracted position of the center section 4 so that the same deck segments 41, in the expanded position of the center section 4, still form a closed or substantially closed circumferential support surface 11 at the center deck 42. Preferably, the deck segments 41 also overlap each other in the expanded position. FIG. 3 shows an alternative tire building drum 101 according to a second embodiment of the invention, which differs from the previously described tire building drum 1 in that the deck segments 141 are provided with fingers or teeth 143 which are arranged to mesh with each other in the contracted position of the center deck 104 so that the same deck segments 141, in the expanded position of the center section 104, still form a closed or substantially closed circumferential support surface 111 at the center deck 142. Preferably, the fingers or teeth 143 also remain meshed in the expanded position.

The deck segments 41 as shown in FIGS. 1A-1D and 2 are solid or single piece deck segments 41. Alternatively, the deck segments may comprise several parts which cooperate to form a center deck (not shown), e.g. deck segments that are telescopically extendable in the circumferential direction of the tire building drum.

As shown in FIG. 2, the tire building drum 1 further comprises a plurality of support members 5 distributed circumferentially about the central drum axis S. Each support member 5 of the plurality of support members 5 is arranged for supporting a respective deck segment 41 of the plurality of deck segments 41 with respect to the central drum axis S. FIGS. 1A-1D show one of the support members 5 in more detail. Said support member 5 is positioned in the axial direction A between the left section 2 and the right section 3 for supporting a respective one of the deck segments 41 in the radially outward direction R1. The support member 5 is movable together with the center section 4 in the radially outward direction R1. More in particular, the support member 5 comprises a column-like and/or radially extending support body 51 that is connected to the deck segment 41 at a center area thereof that is unsupported by the left section 2 and the right section 3. Preferably, the support member 5 is connected to the deck segment 41 in the center C between the left section 2 and the right section 3. In this exemplary embodiment, the support member 5 is directly and/or fixedly connected to the deck segment 41, or forms a single piece and/or an integral part of said deck segment 41.

As shown in FIG. 2, the tire building drum 1 is provided with a plurality of guides 8 for guiding the movement of the support members 5 in the radially outward direction R1. As best seen in FIGS. 1A-1D, the support body 51 of the support member 5 is arranged to engage the respective guide 8. In this exemplary embodiment, the support body 51 is provided with a first chamber 52 for receiving the guide 8, a second chamber 53 and a divider 54 separating the first chamber 52 from the second chamber 53. Said first chamber 52 is delimited in the radially outward direction R1 by the deck segment 41 and in the radially inward direction R2 by the divider 54. Said guide 8 is restricted within the first chamber 52 of the support body 51 like a plunger in a cylinder to limit the movement of the support body 51 with respect to said guide 8 in the radially outward direction R1 and the radially inward direction R2. More in particular, the guide 8 comprises a first stopping member 81 inside the first chamber 52 and/or above the divider 54 for limiting the movement of the support member 5 in the radially outward direction R1. In this exemplary embodiment, the guide 8 further comprises a second stopping member 82 in the radially inward direction R2 outside the first chamber 52 and/or below the divider 54 for stopping the movement of the support member 5 in the radially inward direction R2.

As shown in FIGS. 1A-1D, the tire building drum 1 further comprises a blocking device 6 for blocking or locking the support member 5 against movement in the radially inward direction R2 with respect to the central drum axis S when the center section 4 is in the expanded position as shown in FIG. 1B. The blocking device 6 comprises a blocking surface 61 that is radially fixed with respect to the central drum axis S. The blocking surface 61 is arranged for supporting the support member 5 with respect to the central drum axis S when the center section 4 is in the contracted position, as shown in FIG. 1A. More in particular, the blocking surface 61 is arranged for abutting and thereby stopping the support member 5 against further movement in the radially inward direction R2. In this exemplary embodiment, the blocking surface 61 is supported on the drum shaft 10. Moreover, in this exemplary embodiment, the guide 8 is associated with, supported on or fixed to the blocking surface 61. Preferably, the second stopping member 82 is arranged such that the support member 5 abuts the second stopping member 82 and the blocking surface 61 simultaneously when the center section 4 is in the contracted position, as shown in FIG. 1A.

When the center section 4 is moved from the contracted position, as shown in FIG. 1A, to the expanded position, as shown in FIG. 1B, the support member 5 is moved together with the center section 4 away from the blocking surface 61 in the radially outward direction R1. Consequently, a gap is generated between the blocking surface 61 and the support member 5 in said radially outward direction R1. The blocking device 6 further comprises a first blocking body 62 and a second blocking body 63 which are insertable in a first insertion direction D1 and a second insertion direction D2, respectively, into a blocking position within said gap between the support member 5 and the blocking surface 61. Hence, in said blocking position, the blocking bodies 62, 63 are located in the radially inward direction R2 between the support member 5 and the blocking surface 61 to block movement of said support member 5 in the radially inward direction R2. Hence, the support member 5 is locked and/or blocked against movement in the radially inward direction R2.

In this exemplary embodiment, the first blocking body 62 and the second blocking body 63 extend circumferentially or annularly, like a ring, around the central drum axis S between the blocking surface 61 and the plurality of support members 5.

As shown in FIGS. 1A and 1B, the blocking device 6 comprises at least one insertion biasing element 64 for biasing the blocking bodies 62, 63 to move in the respective insertion directions D1, D2 into the blocking position. As shown in FIG. 1B, the first insertion direction D1 and the second insertion direction D2 are parallel to the axial direction A and/or the central drum axis S. In this exemplary embodiment, the at least one insertion biasing element 64 is a spring that is placed in the axial direction A between the first blocking body 62 and the second blocking body 63 to act on both of said blocking bodies 62, 63 simultaneously. Alternatively, individual insertion biasing elements may be used for each blocking body 62, 63. Hence, once the support member 5 is moved in the radially outward direction R1 sufficiently to clear the blocking bodies 62, 63, said blocking bodies 62, 63 are automatically biased into the blocking position. In this exemplary embodiment, the blocking bodies 62, 63 are slidably movable between the blocking surface 61 and the second stopping member 82 of the guide 8.

Figure 1C:
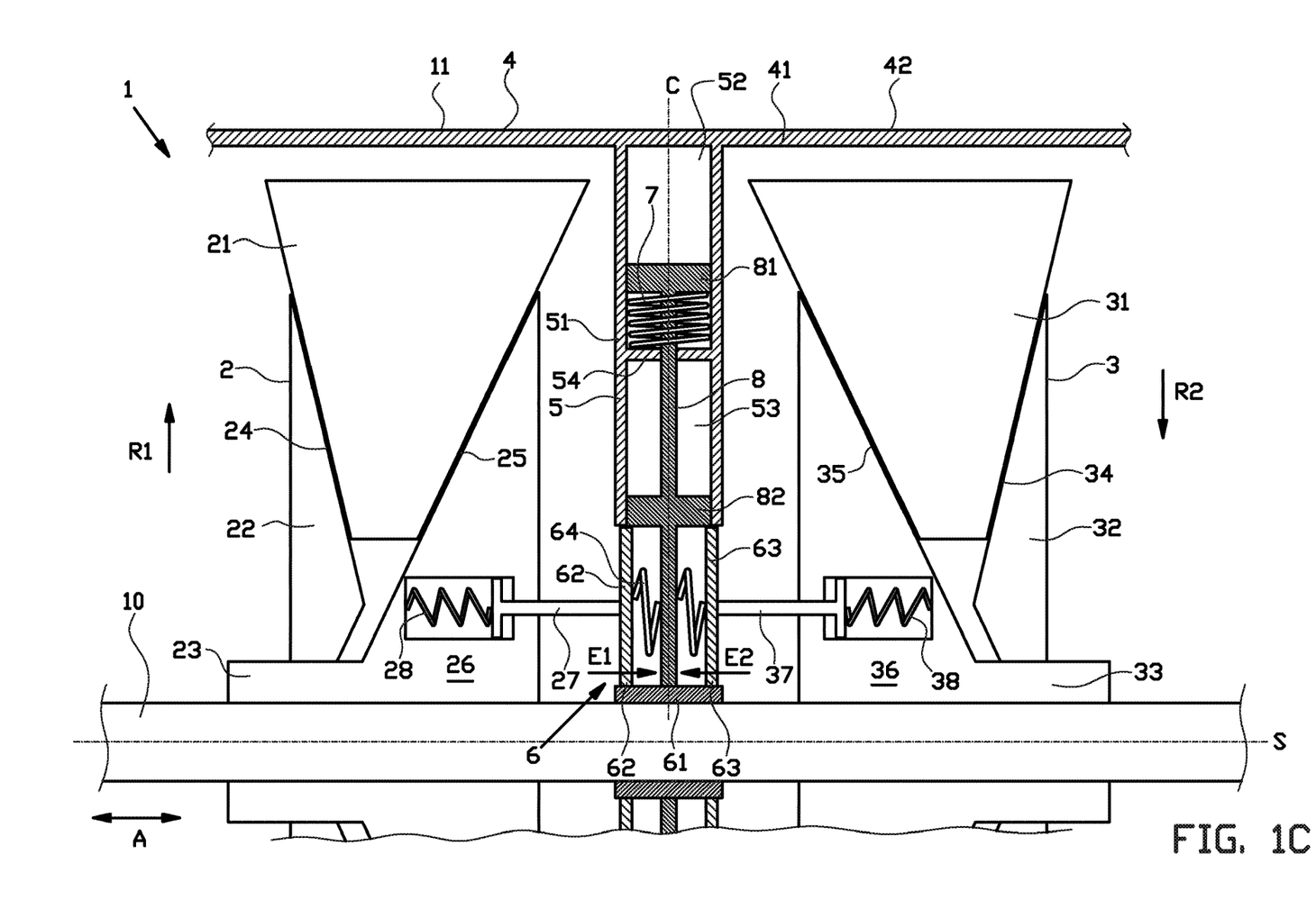
Figure 1D:
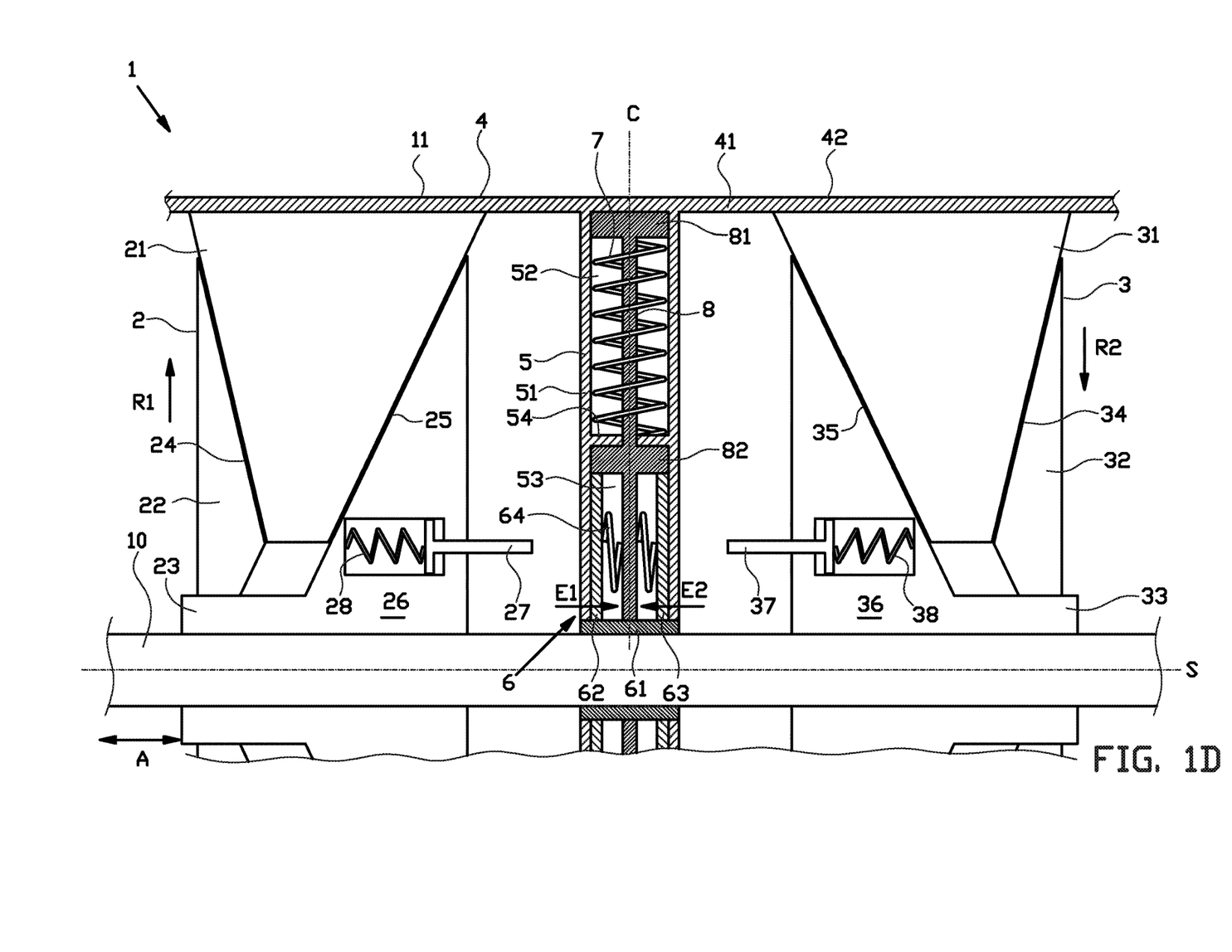

As shown in FIG. 1C, the first blocking body 62 and the second blocking body 63 are displaceable in a first release direction E1 and a second release direction E2, respectively, out of the blocking position into a release position to release and/or unlock the support member 5. The first release direction E1 and the second release direction E2 are opposite to the first insertion direction D1 and the second insertion direction D2, respectively. In the release position, the blocking bodies 62, 63 are misaligned with respect to the support member 5 in the axial direction A to release the blockage of the support member 5. In this particular example, the blocking bodies 62, 63 are moved in the axial direction A towards each other into alignment with the second chamber 53. Hence, said support member 5 is allowed to be lowered alongside the blocking bodies 62, 63 in the radially inward direction R2. The blocking bodies 62, 63 are then contained within said second chamber 53. As shown in FIG. 1D, displacing the blocking bodies 62, 63 from the blocking position allows for the support member 5 to move in the radially inward direction R2 again. In this exemplary embodiment, the displacement of the blocking bodies 62, 63 in their respective release directions E1, E2 is actuated by the left section 2 and the right section 3. In particular, the left section 2 is movable in the axial direction A into abutment with the first blocking body 62 in order to displace said first blocking body 62 in the first release direction E1 through said abutment. Similarly, the right section 3 is movable in the axial direction A into abutment with the second blocking body 63 in order to displace said second blocking body 63 in the second release direction E2 through said abutment.

More in particular, as shown in FIG. 1C, the left section 2 comprises a base 26 and a first displacement member 27 for displacing the first blocking body 62 in the first release direction E1. Said first displacement member 27 protrudes from the base 26 towards the first blocking body 62. As shown in FIG. 1A, the first displacement member 27 can be pressed into the base 26 in a direction parallel to the first insertion direction D1 to allow for the left section 2 to approach the support member 5 as close as possible. The left section 2 further comprises a displacement biasing element 28 for biasing the first displacement member 27 with respect to the base 26 in the first release direction E1, as shown in FIG. 1C. The displacement biasing element 28 is stronger than the insertion biasing element 64 such that the first displacement member 28 can effectively displace the first blocking body 61 in the first release direction E1.

Similarly, the right section 3 comprises a base 36 and a second displacement member 37 for displacing the second blocking body 63 in the second release direction E2. The second displacement member 37 protrudes in the same way towards the second blocking body 63, can be pressed into the base 36 in a direction parallel to the second insertion direction D2 and is biased with respect to said base 36 by a respective displacement biasing element 38 to move in the second release direction E2. Again, the displacement biasing element 38 is stronger than the insertion biasing element 64.

As shown in FIGS. 1C and 1D, the tire building drum 1 is provided with return member 7 for returning the support member 5 in the radially inward direction R2 when the blockage of the support member 5 in said radially inward direction R2 is released. Hence, the return member 7 can ensure that the support member 5, and the deck segment 41 associated therewith, are moved in the radially inward direction R2 together with the left section 2 and the right section 3 as soon as the blockage of the support member 5 is released. In this particular embodiment, the return member 7 is a return spring that biases the support member 5 in the radially inward direction R2. The return member 7 is arranged in the radially inward direction R2 between the first stopping member 81 of the guide 8 and the divider 54 of the support member 5 to bias and/or move the support member 5 with respect to said guide 8 in the radially inward direction R2. Preferably, the support member 5 is arranged to be returned to such an extent that the support member 5 abuts and/or is directly supported on the blocking surface 61.

A method for operating the aforementioned tire building drum 1 will be elucidated below with reference to FIGS. 1A-1D and FIG. 2.

FIG. 1A shows the situation in which the center section 4 of the tire building drum 1 is in the contracted position. The center section 4 rests on the left section 2 and the right section 3 which are both contracted in the radially inward direction R2 towards the central drum axis S. The left section 2 and the right section 3 have been driven in the axial direction A into close proximity to the support member 5. In particular, the first displacement member 27 and the second displacement member 37 have been pressed into their respective bases 26, 36 against the biasing force of their respective displacement biasing elements 28, 38 as a result of the abutting contact with the support body 51 of the support member 5. Preferably, the support member 5 is directly and/or rigidly supported on the blocking surface 61 of the blocking device 6. The blocking bodies 62, 63 are contained in the axial direction A in the second chamber 53 of the support member 5. The insertion biasing element 64 is exerting a biasing force onto the first blocking body 62 and the second blocking body 63 in the first insertion direction D1 and the second insertion direction D2, respectively.

FIG. 1B shows the situation in which the crown drives 23, 33 of the left section 2 and the right section 3 are moved axially outward with respect to each other to drive the crown segments 21, 31 in the radially outward direction R1. Hence, the diameter of the tire building drum 1 at said crown segments 21, 31 is increased. The center section 4, which is supported on the crown segments 21, 31 of the left section 2 and the right section 3, is expanded together with said crown segments 21, 31 in the radially outward direction R1 into the expanded position. The support member 5 is moved in the radially outward direction R1 together with the center section 4 to expose the blocking bodies 62, 63. In particular, when the center section 4 is in the expanded position, the support member 5 has been moved in the radially outward direction R1 to such an extent that the blocking bodies 62, 63 are no longer contained in the second chamber 53 in the axial direction A. Hence, the biasing force exerted by the insertion biasing element 64 onto the blocking bodies 62, 63 causes said blocking bodies 62, 63 to move into the blocking position underneath the support member 5. The support member 5 is now blocked against movement in the radially inward direction R2 by the blocking bodies 62, 63 which are in turn supported in the radially inward direction R2 on the blocking surface 61. The combination of the support member 5, the blocking bodies 62, 63 and the blocking surface 61 now supports the center section 4 in the radially inward direction R2 with respect to the drum shaft 10, thereby significantly increasing the rigidity of said center section 4 with respect to said drum shaft 10.

In FIG. 1B, the return member 7 is compressed between the first stopping member 81 and the divider 54 to build up a biasing force that is arranged to bias the support member 5 with respect to the guide 8 in the radially inward direction R2.

FIG. 1C shows the situation in which the blocking bodies 62, 63 are moved towards each other in their respective release directions E1, E2 against the biasing force of the insertion biasing element 64 towards the release position to release and/or terminate the blockage of the support member 5 in the radially inward direction R2 by the blocking bodies 62, 63. The movement of the blocking bodies 62, 63 in their respective release directions E1, E2 is effectuated by moving the crown drives 23, 33 of the left section 2 and the right section 3 towards each other in the axial direction A. This not only initiates the contraction of the respective crown segments 21, 31 in the radially inward direction R2 but also brings the first displacement member 27 and the second displacement member 37 into abutting contact with the first blocking body 62, and the second blocking bodies 63, respectively. As the displacement biasing elements 28, 38 are stronger than the insertion biasing element 64, the abutting contact will cause the blocking bodies 62, 63 to move towards each other in their respective release directions E1, E2 until said blocking bodies 62, 63 are again in alignment with the second chamber 53 in the radially outward direction R1.

As shown in FIG. 1C, the crown segments 21, 31 may already be contracted slightly in the radially inward direction R2 while the support member 5, and thus the center section 4, is still blocked against movement in said radially inward direction R2. In this exemplary embodiment, the delay in the release and/or termination of the blockage of the support member 5 is caused by the distance travelled by the left section 2 and the right section 3 in the axial direction A before said sections 2, 3 contact and displace the blocking bodies 62, 63. In FIG. 1B, the gap between the displacement members 27, 37 and the blocking bodies 62, 63 in the axial direction A has been exaggerated. In practice, the gap may be as small as a few millimeters or even non-existent. In such case, the release and/or termination of the blockage of the support member 5 may closely follow the contraction of the crown segments 21, 31.

FIG. 1D shows the situation in which the release and/or termination of the blockage of the support member 5 has been completed. The blocking bodies 62, 63 have been moved fully into the release position by the respective displacement members 27, 37. The crown drives 23, 33 and the crown supports 22, 32 have been moved apart in the axial direction A to lower the respective crown segments 21, 31 in the radially inward direction R2. The return member 7 has biased the support member 5 to move in the radially inward direction R2 alongside the blocking bodies 62, 63 towards the blocking surface 61. When the support member 5 has been at least partially moved in the radially inward direction R2 over the blocking bodies 62, 63 and said blocking bodies 62, 63 are at least partially contained within the second chamber 53 of the support member 5, the left section 2 and the right section 3 are moved apart in the axial direction A to move clear of the support member 5 and the blocking device 6. In particular, the displacement members 27, 37 are spaced apart and/or no longer in contact with the blocking bodies 62, 63. Thus, the support member 5 can be lowered further in the radially inward direction R2 without running into the displacement members 27, 37. As shown in FIG. 1D, the support member 5 has been biased by the return member 7 to move into abutment with the blocking surface 61. Hence, a return position is obtained in which the center section 4 has now been returned to the contracted position of FIGS. 1A and 1s rigidly supported on the blocking surface 61.

Figure 4:
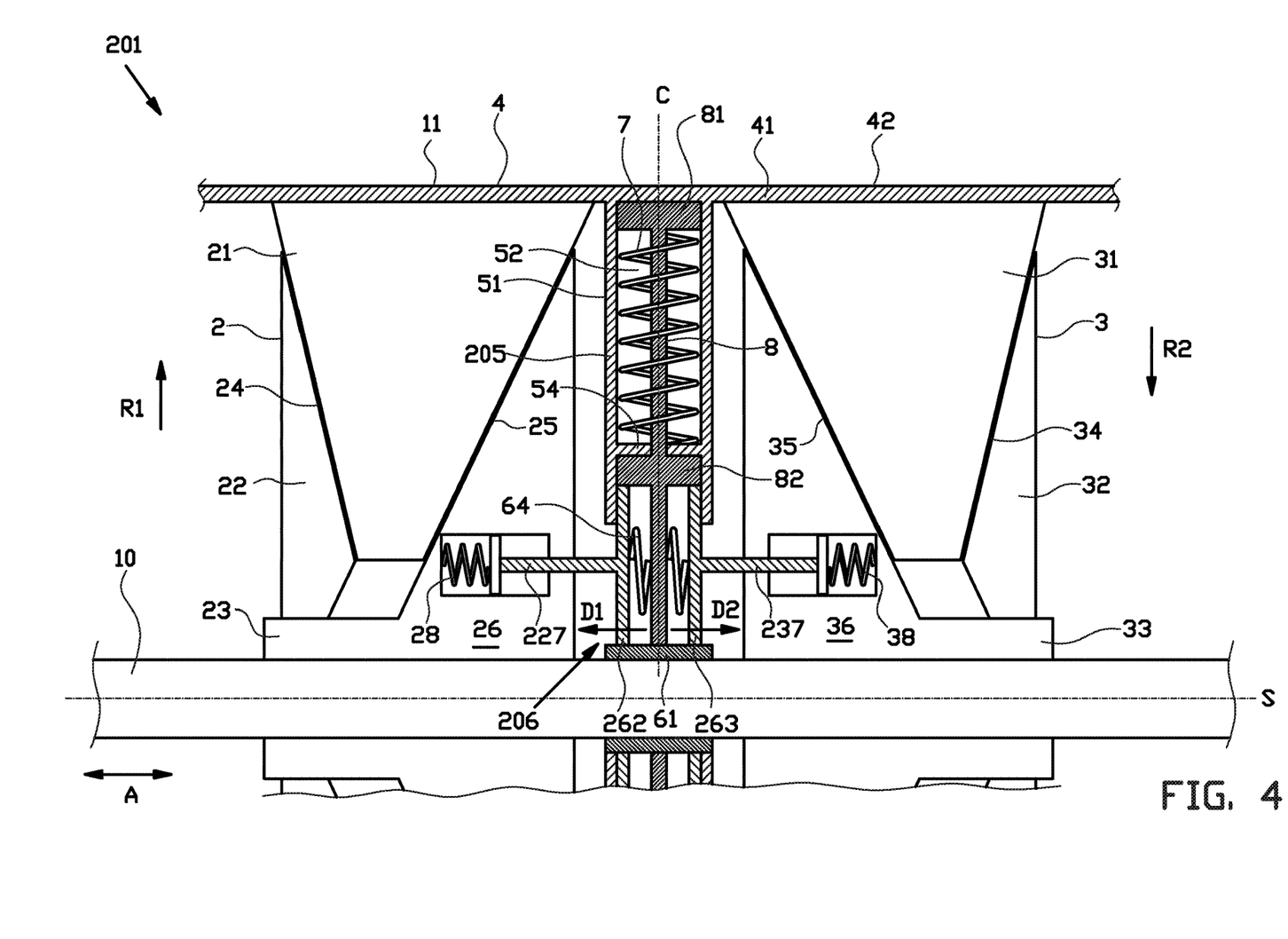
FIG. 4 shows a cross section of a further alternative tire building drum according to a third embodiment of the invention in a contracted position.

FIG. 4 shows a further alternative tire building drum 201 according to a third embodiment of the invention that differs from the previously discussed tire building drums 1, 101 in that the first displacement member 227 and the second displacement member 237 are not part of the left section 2 and the right section 3, respectively. Instead, the first displacement member 227 and the second displacement member 237 are connected directly to the first blocking body 262 and the second blocking body 263 of the blocking device 206 and act on the respective displacement biasing elements 28, 38 from said blocking bodies 262, 263. Consequently, its support member 205 can not extend in the radially inward direction R2 up to the blocking surface 61. Instead, at least at the displacement members 227, 237, the support member 205 terminates short of the first displacement member 227 and the second displacement member 237 when the center section 4 is in the radially contracted position as shown in FIG. 4.

Figure 5:
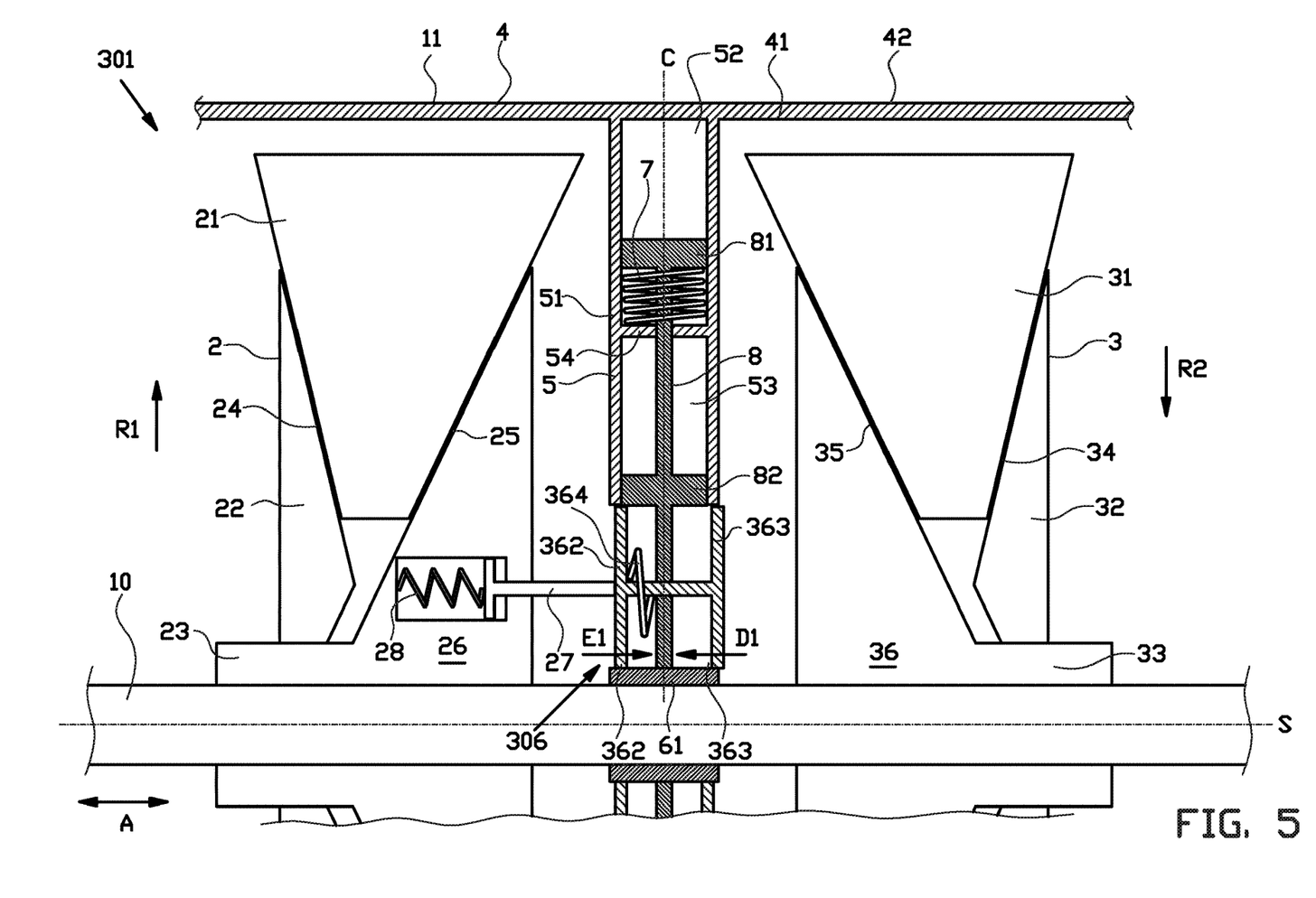
FIG. 5 shows a cross section of a further alternative tire building drum according to a fourth embodiment of the invention in a release position.

FIG. 5 shows a further alternative tire building drum 301 according to a fourth embodiment of the invention that differs from the previously discussed tire building drums 1, 101, 201 in that the first blocking body 362 and the second blocking body 363 of the blocking device 306 are interconnected to move together in the first insertion direction D1 and the first release direction E1. The insertion biasing element 364 is adapted to exert a biasing force onto the first blocking body 362 only. Hence, only the first displacement member 27 is required to displace both blocking bodies 362, 363.

Figure 6:
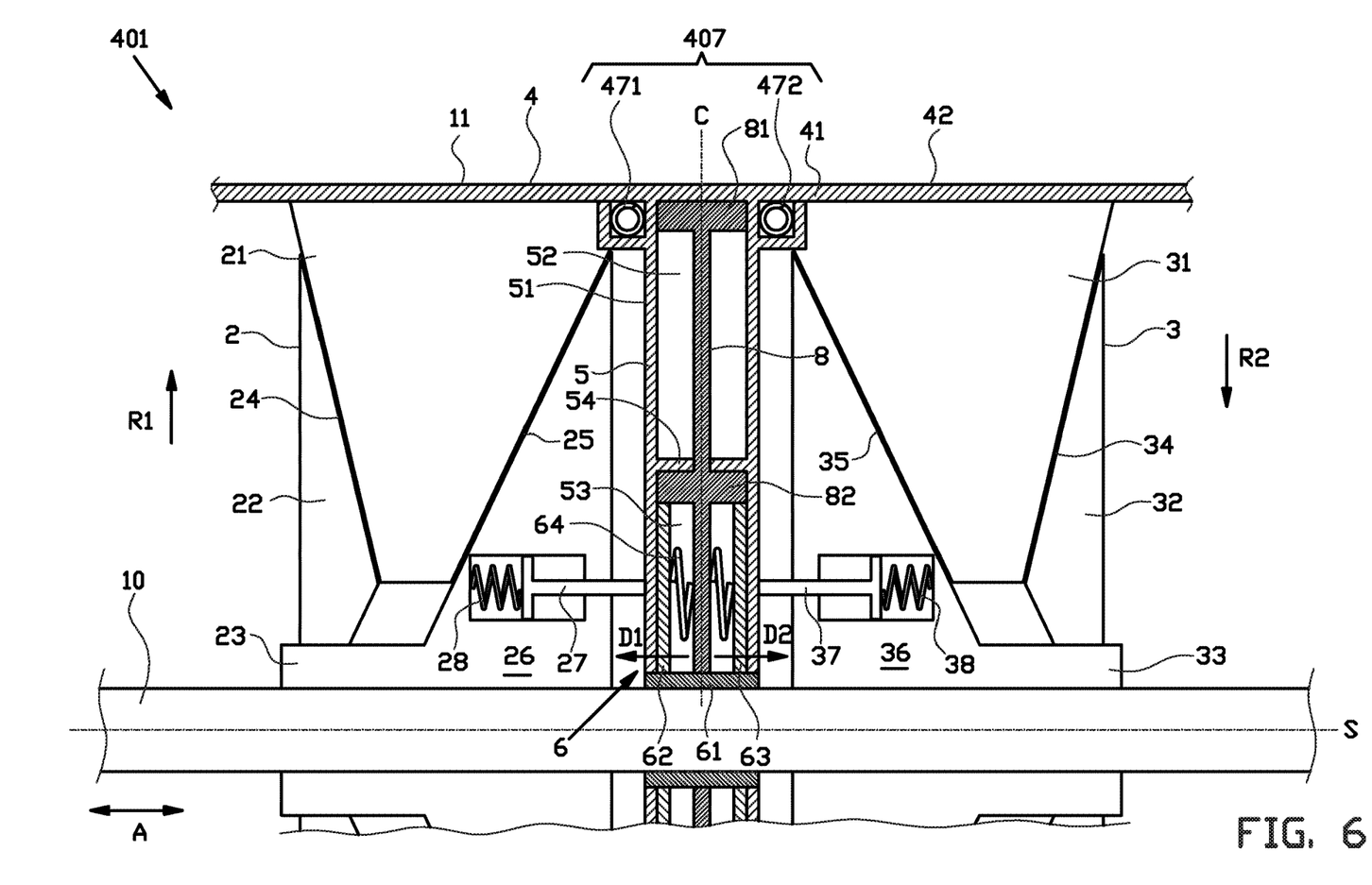
FIG. 6 shows a cross section of a further alternative tire building drum according to a fifth embodiment of the invention in a contracted position.
Figure 7:
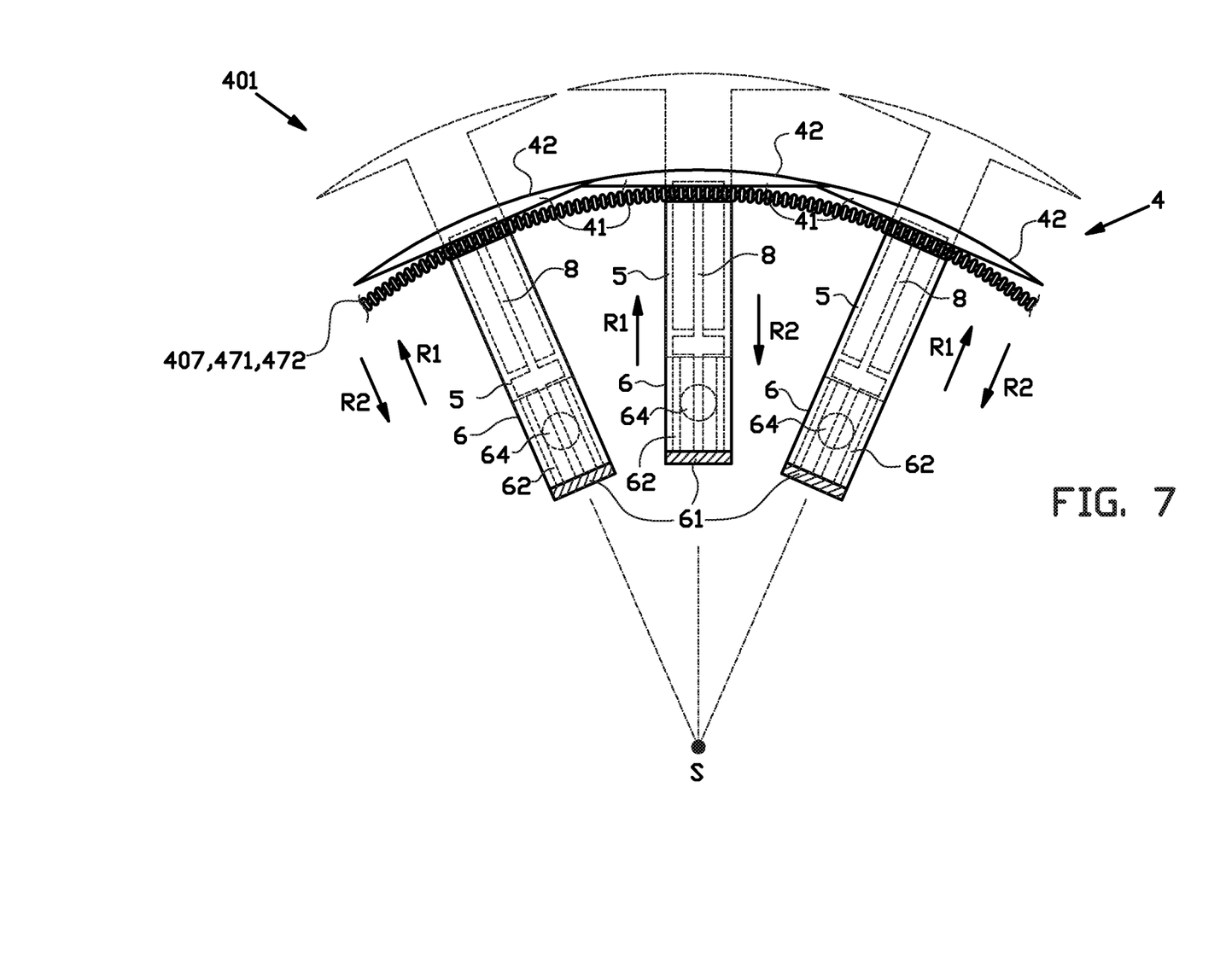
FIG. 7 show a side view of the further alternative tire building drum according to FIG. 6.

FIGS. 6 and 7 show a further alternative tire building drum 401 according to a fifth embodiment of the invention that differs from the previously discussed tire building drums 1, 101, 201, 301 in that it is provided with an alternative return member 407 for returning the support member 5 in the radially inward direction R2 when the blockage of the support member 5 in said radially inward direction R2 is released. Unlike the previously discussed return member 7, the alternative return member 407 is not arranged between the first stopping member 81 and the divider 54. Instead, the alternative return member 407 comprises one or more springs 471, 472 that extend annularly or circumferentially about the central drum axis S through each of the deck segments 41. The one or more springs 471, 472 are arranged to be stretched in the expanded position and biased to contract to the return position. Hence, the one or more springs 471, 472 are common to all deck segments 41 and are arranged to simultaneously pull or bias all of the deck segments 41 inwards in the radially inward direction R2. It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary the invention relates to a tire building drum 1, 101, 201, 301, 401 and a method for operating said tire building drum 1, 101, 201, 301, 401. The tire building drum 1, 101, 201, 301, 401 comprises a left section 2, a right section 3 and a center section 4, 104, wherein the center section 4, 104 is expandable in a radially outward direction R1 to an expanded position, wherein the tire building drum 1, 101, 201, 301, 401 comprises a support member 5 for supporting the center section 4, 104 in the radially outward direction R1, wherein the support member 5 is movable together with the center section 4, 104 in the radially outward direction R1, wherein the tire building drum 1, 101, 201, 301, 401 further comprises a blocking device 6 for blocking the support member 5 against movement in a radially inward direction R2 when the center section 4, 104 is in the expanded position.

The invention claimed is:

1. A tire building drum comprising a left section, a right section and a center section which are rotatable about a central drum axis, wherein the center section forms a circumferential support surface of the tire building drum for supporting one or more tire components, wherein the left section and the right section are expandable in a radially outward direction with respect to the central drum axis, wherein the center section is supported on the left section and the right section and expandable in the radially outward direction with respect to the central drum axis together with the left section and the right section from a contracted position to an expanded position, wherein the tire building drum comprises a support member in the axial direction between the left section and the right section for supporting the center section in the radially outward direction, wherein the support member is connected to the center section and is movable together with the center section in the radially outward direction, wherein the tire building drum further comprises a blocking device for blocking the support member against movement in a radially inward direction with respect to the central drum axis when the center section is in the expanded position, wherein the blocking device comprises a blocking surface that is radially fixed with respect to the central drum axis, wherein the support member is arranged for abutting the blocking surface when the center section is in the contracted position, wherein the support member is arranged to be moved in the radially outward direction away from said blocking surface when the center section is moved towards the expanded position, wherein the blocking device further comprises a first blocking body that is insertable in a first insertion direction into a blocking position in which the first blocking body is located in the radially inward direction between the support member and the blocking surface to block movement of the support member in the radially inward direction.

2. The tire building drum according to claim 1, wherein the blocking device comprises a second blocking body that is insertable in a second insertion direction opposite to the first insertion direction into a blocking position in which the second blocking body is located in the radially inward direction between the support member and the blocking surface.

3. The tire building drum according to claim 1, wherein the blocking device comprises a second blocking body that is movable in the first insertion direction together with the first blocking body into a blocking position in which the second blocking body is located in the radially inward direction between the support member and the blocking surface.

4. The tire building drum according to claim 1, wherein the first insertion direction is an axial direction parallel to the central drum axis.

5. The tire building drum according to claim 1, wherein the blocking device comprises an insertion biasing element for biasing the first blocking body to move in the first insertion direction into the blocking position.

6. The tire building drum according to claim 2, wherein the blocking device comprises an insertion biasing element that is located between the first blocking body and the second blocking body for biasing the first blocking body and the second blocking body to move in the first insertion direction and the second insertion direction, respectively, into the blocking position.

7. The tire building drum according to claim 5, wherein the left section and the right section are movable in an axial direction parallel to the central drum axis, wherein the left section is arranged for displacing the first blocking body in a first release direction opposite to the first insertion direction from the blocking position into a release position for releasing the blockage of the support member in the radially inward direction.

8. The tire building drum according to claim 7, wherein the left section comprises a base and wherein the tire building drum comprises a first displacement member that is movable with respect to the base in a direction parallel to the first insertion direction for displacing the first blocking body in the first release direction, wherein the left section further comprises a displacement biasing element for biasing the first displacement member in the first release direction.

9. The tire building drum according to claim 8, wherein the displacement biasing element is stronger than the insertion biasing element.

10. The tire building drum according to claim 6, wherein the left section and the right section are movable in an axial direction parallel to the central drum axis, wherein the left section and the right section are arranged for displacing the first blocking body and the second blocking body in a first release direction and a second release direction, respectively, opposite to the first insertion direction and the second insertion direction, respectively, from the blocking position into a release position for releasing the blockage of the support member in the radially inward direction.

11. The tire building drum according to claim 6, wherein the tire building drum further comprises a return member for returning the support member in the radially inward direction when the blockage of the support member is released.

12. The tire building drum according to claim 1, wherein the support member is arranged for supporting the center section in a center area where the center section is unsupported by the left section and the right section.

13. The tire building drum according to claim 1, wherein the support member is arranged for supporting the center section at a center of said center section between the left section and the right section.

14. The tire building drum according to claim 1, wherein the support member is directly connected to the center section.

15. The tire building drum according to claim 1, wherein the center section comprises a plurality of deck segments that together form a center deck that defines the circumferential support surface of the tire building drum, wherein the tire building drum comprises one support member for each deck segment.

16. The tire building drum according to claim 15, wherein each support member is formed as a single piece with its respective deck segment.

17. The tire building drum according to claim 1, wherein the tire building drum further comprises a guide for guiding the movement of the support member in the radially outward direction and the radially inward direction.

18. The tire building drum according to claim 17, wherein the guide comprises a first stopping member for restricting the movement of the support member in the radially outward direction.

19. The tire building drum according to claim 17, wherein the guide comprises a second stopping member for restricting the movement of the support member in the radially inward direction.

20. The tire building drum according to claim 19, wherein the support member is arranged for abutting the second stopping member when the center section is in the contracted position.

21. The tire building drum according to claim 15, wherein the deck segments are arranged for overlapping each other in a circumferential direction of the tire building drum when the center section is in the contracted position and/or the expanded position.

22. The tire building drum according to claim 15, wherein the deck segments are arranged for meshing with each other in a circumferential direction of the tire building drum when the center section is in the contracted position and/or the expanded position.

23. A method for operating a tire building drum which drum comprises a left section, a right section and a center section which are rotatable about a central drum axis, wherein the center section forms a circumferential support surface of the tire building drum for supporting one or more tire components, wherein the left section and the right section are expandable in a radially outward direction with respect to the central drum axis, wherein the center section is supported on the left section and the right section and expandable in the radially outward direction with respect to the central drum axis together with the left section and the right section from a contracted position to an expanded position, wherein the tire building drum comprises a support member in the axial direction between the left section and the right section for supporting the center section in the radially outward direction, wherein the support member is connected to the center section and is movable together with the center section in the radially outward direction, wherein the tire building drum further comprises a blocking device for blocking the support member against movement in a radially inward direction with respect to the central drum axis when the center section is in the expanded position, wherein the blocking device comprises a blocking surface that is radially fixed with respect to the central drum axis, wherein the support member is arranged for abutting the blocking surface when the center section is in the contracted position, wherein the support member is arranged to be moved in the radially outward direction away from said blocking surface when the center section is moved towards the expanded position, wherein the blocking device further comprises a first blocking body that is insertable in a first insertion direction into a blocking position in which the first blocking body is located in the radially inward direction between the support member and the blocking surface to block movement of the support member in the radially inward direction, wherein the method comprises the steps of:

> expanding the left section and the right section in the radially outward direction;
>
> expanding the center section in the radially outward direction into the expanded position together with the left section and the right section;
>
> moving the support member together with the center section in the radially outward direction;
>
> using the blocking device to block the support member against movement in the radially inward direction with respect to the central drum axis when the center section is in the expanded position.

24. The method according to claim 23, wherein the method further comprises the step of moving the left section and the right section in an axial direction parallel to the central drum axis, wherein the movement of the left section in the axial direction releases the blockage of the support member in the radially inward direction.

25. The method according to claim 24, wherein the movement of the right section in the axial direction releases the blockage of the support member in the radially inward direction.

* * * * *